US012791801B2

(12) United States Patent
Cheng et al.

(10) Patent No.: US 12,791,801 B2
(45) Date of Patent: Nov. 10, 2026

(54) SEMICONDUCTOR PHOTONIC PACKAGE

(71) Applicant: TAIWAN SEMICONDUCTOR MANUFACTURING COMPANY LTD., Hsinchu (TW)

(72) Inventors: Hsiang-Ting Cheng, Taoyuan (TW); Shih-Yu Liao, Hsinchu (TW); Tao-Cheng Liu, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 350 days.

(21) Appl. No.: 18/427,846

(22) Filed: Jan. 31, 2024

(65) Prior Publication Data

US 2025/0244544 A1 Jul. 31, 2025

(51) Int. Cl.
*G02B 6/42* (2006.01)

(52) U.S. Cl.
CPC .................................. *G02B 6/4214* (2013.01)

(58) Field of Classification Search
CPC .................................................... G02B 6/4214
See application file for complete search history.

(56) References Cited

U.S. PATENT DOCUMENTS

| | | | | | |
|---|---|---|---|---|---|
| 7,800,826 | B2 * | 9/2010 | Togino | G02B 13/06 359/725 |
| 12,007,611 | B2 * | 6/2024 | Kuo | G02B 6/29328 |
| 2011/0091157 | A1 * | 4/2011 | Yao | G02B 6/13 385/39 |
| 2012/0251033 | A1 * | 10/2012 | Matsuoka | G02B 6/42 385/8 |

* cited by examiner

*Primary Examiner* — Sung H Pak
(74) *Attorney, Agent, or Firm* — WPAT LAW; Anthony King

(57) ABSTRACT

A semiconductor photonic package includes a first photonic die and a second photonic die laterally disposed over a substrate, a light divergence structure disposed over the first photonic die and beside the second photonic die, and a light source disposed over the light divergence structure. The light source provides an optical signal vertically to the first photonic die, and the optical signal is reflected or refracted to be laterally directed to the second photonic die by the light divergence structure. The light divergence structure allows the optical signals to be directed to optical signal receivers in various locations and/or at various depths, and thus improves signal receiving in a multi-type semiconductor photonic package.

20 Claims, 13 Drawing Sheets

SEMICONDUCTOR PHOTONIC PACKAGE

BACKGROUND

Photonic devices are used in integrated circuits (ICs) to carry signals from one component to another component at a higher speed than that possible using only electrical signals. With a photonic device, electrical signals are converted into optical signals at one end of a waveguide, the optical signals propagate along the waveguide, and the optical signals are converted back into electrical signals at another end of the waveguide. In such way, optical and electrical signaling and processing are combined for signal transmission.

Accordingly, photonic devices that include integrated optical components and electrical components are used for conversion between optical signals and electrical signals, as well as processing of the optical signals and the electrical signals.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 1A to 1D are schematic views of a light divergence structure according to aspects of the present disclosure in one or more embodiments, wherein FIG. 1A is a side view of the light divergence structure, FIG. 1B is a top view of the light divergence structure, FIG. 1C is a schematic drawing illustrating the light divergence structure when light is introduced, and FIG. 1D is a partial view taken from circle A of FIG. 1C.

FIGS. 2A to 2C are schematic views of a light divergence structure according to aspects of the present disclosure in one or more embodiments, wherein FIG. 2A is a side view of the light divergence structure when light is introduced, FIG. 2B is a top view of the light divergence structure, and FIG. 2C is a partial view taken from frame B of FIG. 2B.

FIGS. 3A to 3C are schematic views of a light divergence structure according to aspects of the present disclosure in one or more embodiments, wherein FIG. 3A is a side view of the light divergence structure when light is introduced, FIG. 3B is a top view of the light divergence structure, and FIG. 3C is a partial view taken from frame C of FIG. 3B.

DETAILED DESCRIPTION

Figure 1A:
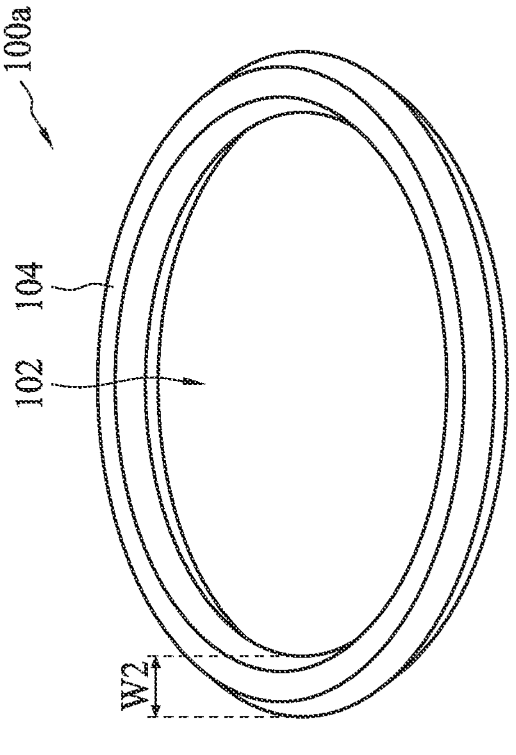

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper," "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, although the terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective test measurements. Also, as used herein, the terms "substantially," "approximately" or "about" generally mean within a value or range that can be contemplated by people having ordinary skill in the art. Alternatively, the terms "substantially," "approximately" or "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

Optical signaling and processing has been used increasing numbers of applications in recent years, due to increases in fiber-related applications for signal transmission. However, optical fiber-related signal transmission is space-constrained due to a unidirectional feature of the optical fiber.

In the present disclosure, various aspects of a semiconductor photonic package are provided. Three-dimensional (3D) packages including both optical devices and electrical devices and methods of forming the same are provided, in accordance with some embodiments. In some embodiments, a light divergence structure is provided in the semiconductor photonic package such that optical signals can be directed to optical signal receivers in various planes and/or at various depths. Accordingly, the light divergence structure helps to improve signal receiving in a multi-type semiconductor photonic package.

Figure 1B:
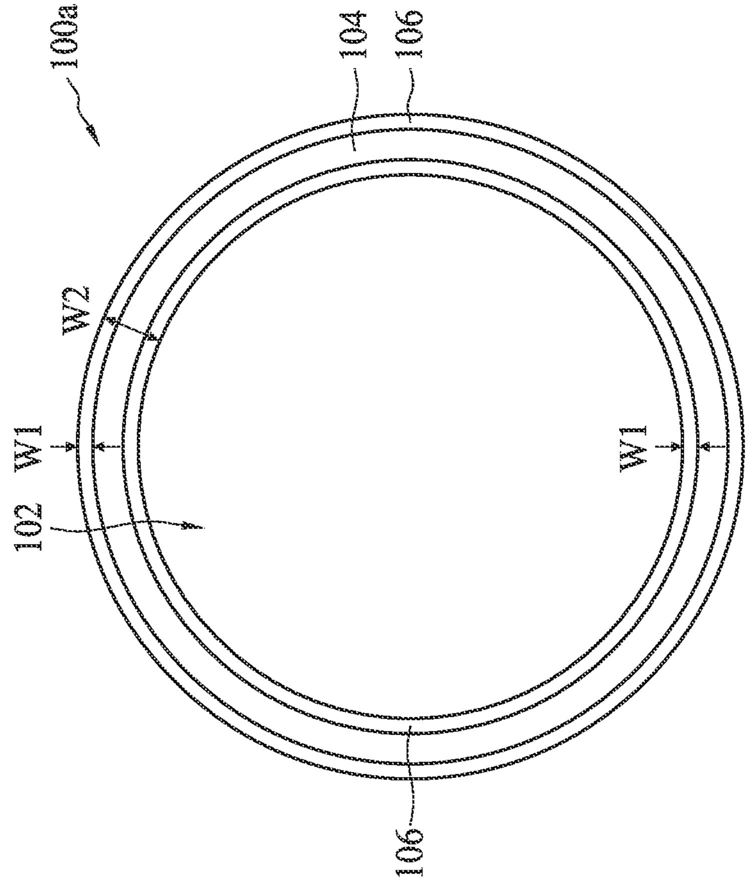

FIGS. 1A to 1D are schematic views of a light divergence structure according to aspects of the present disclosure in one or more embodiments, wherein FIG. 1A is a side view of the light divergence structure, and FIG. 1B is a top view of the light divergence structure. A light divergence structure 100*a* is provided. In some embodiments, the light divergence structure 100*a* can be a flying saucer-like structure having a central hollow portion 102. The light divergence structure 100*a* includes a main body 104, and the main body 104 includes a transparent material, such as quartz, glass, plastic or fluorites, but the disclosure is not limited thereto. The central hollow portion 102 of the light divergence structure 100*a* can include various shapes. For example, the central hollow portion 102 can have a circular shape, as shown in FIGS. 1A and 1B. In other embodiments, the central hollow portion 102 can have a square shape, a triangular shape, or another suitable shape.

In some embodiments, the light divergence structure 100*a* may include a reflective coating 106 disposed over the main body 104. In some embodiments, the reflective coating 106 entirely covers a light-receiving surface of the main body 104. In other embodiments, the reflective coating 106 entirely covers a portion of the light-receiving surface of the main body 104. In such embodiments, a width W1 of the reflective coating 106 is less than a width W2 of the main body 104. For example, the reflective coating 106 may cover an outer rim of the main body 104. In some embodiments, the reflective coating 106 may cover an inner rim of the main body 104. In other embodiments, the reflective coating 106 may cover both the outer rim and the inner rim of the main body 104, as shown in FIG. 1B. In some embodiments, the reflective coating 106 may include metal materials. For example, the reflective coating 106 may include aluminum (Al), aluminum-copper (AlCu) alloy, aluminum silicon copper (AlSiCu), aluminum-silicon (AlSi) alloy, aluminum chromium (AlCr), or the like.

Figure 1D:
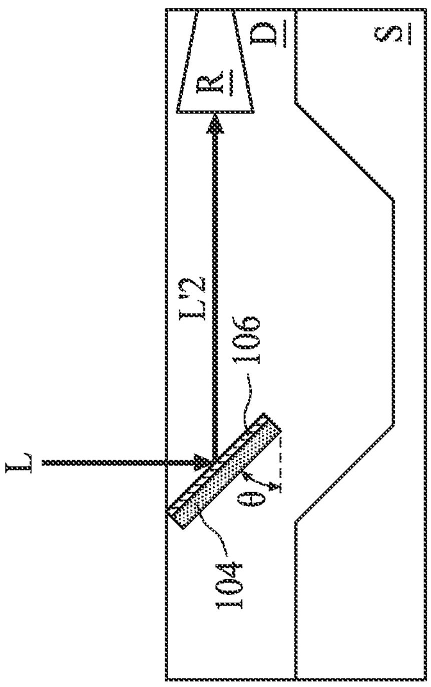
Figure 1C:
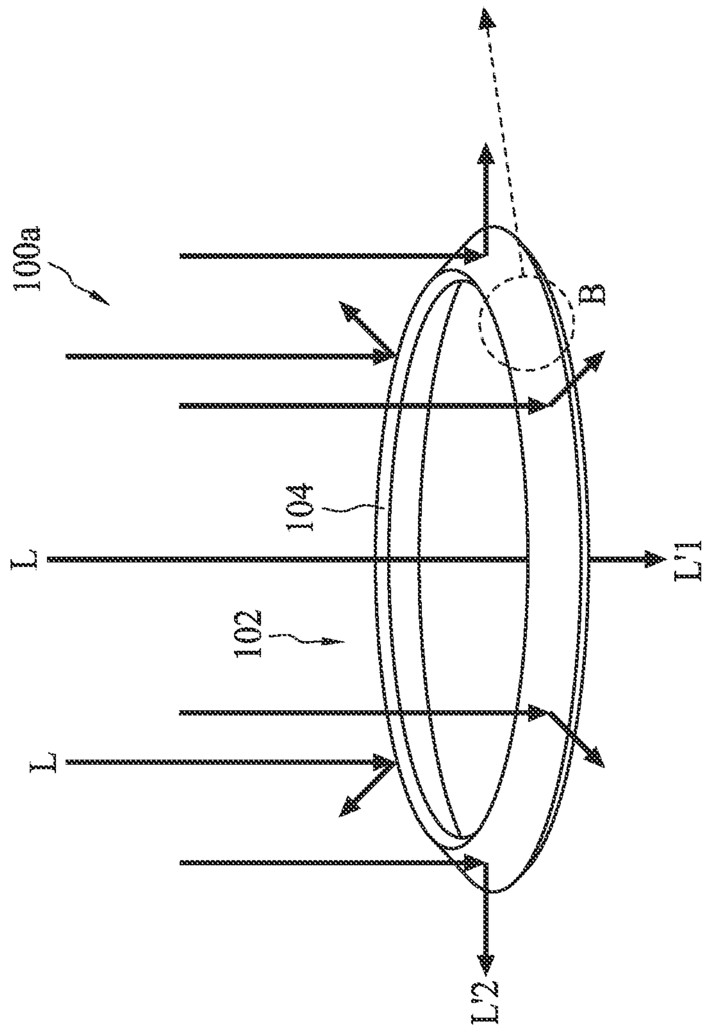

FIGS. 1C and 1D are schematic drawings illustrating the light divergence structure 100*a* when light is introduced, wherein FIG. 1D is a partial view taken from a circle A of FIG. 1C. In some embodiments, an optical signal L may pass through the central hollow portion 102, thereby forming penetrating beams L'1. Simultaneously, light may be reflected by the reflective coating 106, thereby forming divergent beams L'2, as shown in FIG. 1C. In some embodiments, the light divergence structure 100*a* functions as an all-angle light divergence structure because the divergent beams L'2 are reflected in multiple directions by the light divergence structure 100*a*. In some embodiments, the light divergence structure 100*a* is disposed in a photonic device. Further, an included angle θ formed by the light divergence structure 100*a* and a substrate S of the photonic device is between approximately 0° and approximately 90°. In such embodiments, the divergent beams L'2 may be directed to an optical signal receiver R, as shown in FIG. 1D.

Figure 2A:
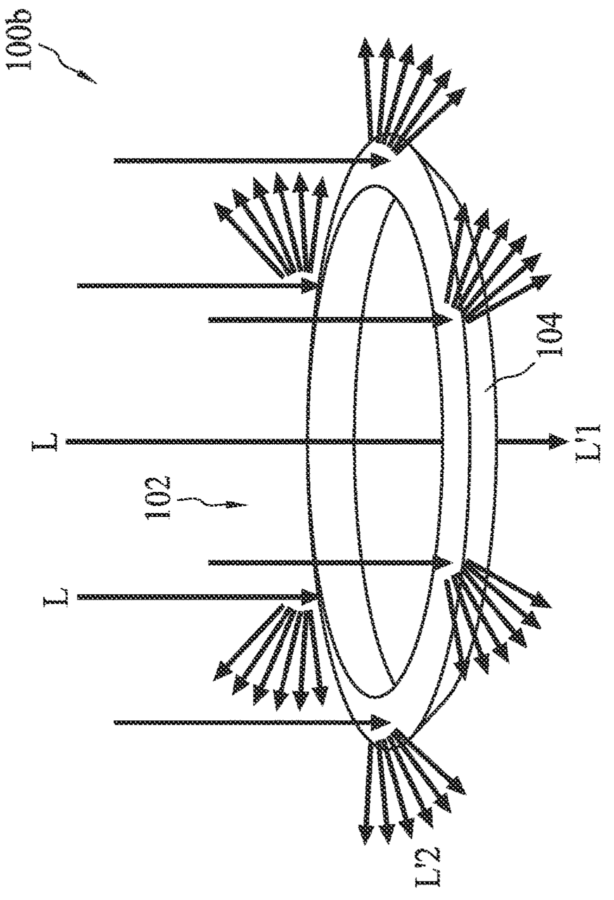
Figure 2B:
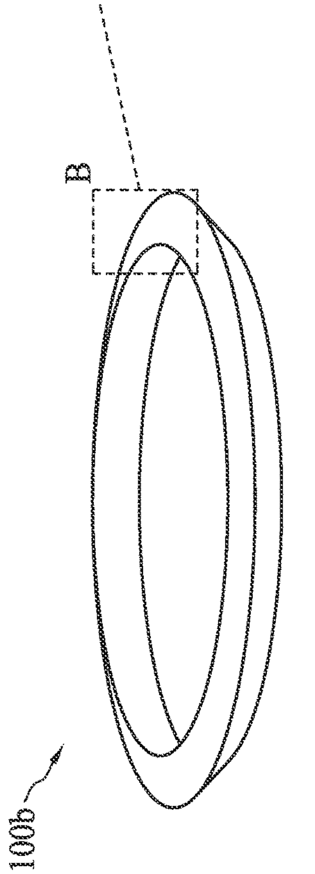
Figure 2C:
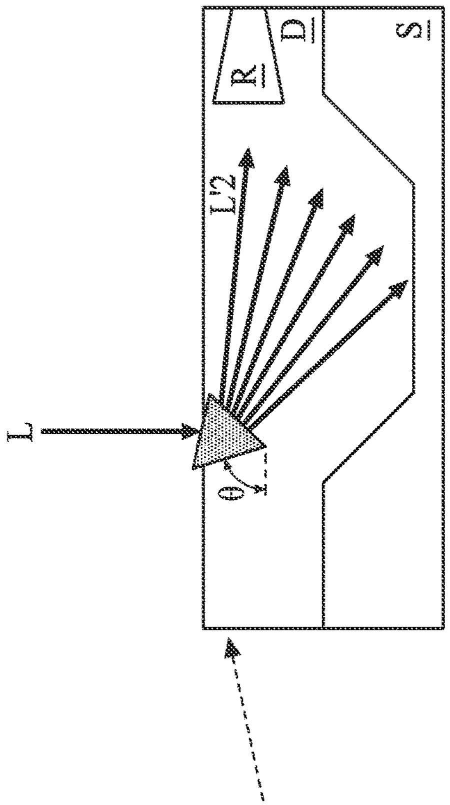

FIGS. 2A to 2C are schematic views of a light divergence structure according to aspects of the present disclosure in one or more embodiments, wherein FIG. 2A is a side view of the light divergence structure when light is introduced, FIG. 2B is a top view of the light divergence structure, and FIG. 2C is a partial view taken from frame B of FIG. 2B. In some embodiments, a light divergence structure 100*b* is provided, and the light divergence structure 100*b* can be a disc structure having a central hollow portion 102. Further, a cross-sectional view of the light divergence structure 100*b* may be a prism (shown in FIG. 2C). The light divergence structure 100*b* includes a main body 104. In some embodiments, the main body 104 includes a transparent material, such as quartz, but the disclosure is not limited thereto. The central hollow portion 102 of the light divergence structure 100*b* can include various shapes. For example, the central hollow portion 102 can have a circular shape, as shown in FIGS. 2A and 2B. In other embodiments, the central hollow portion 102 can have a square shape, a triangular shape, or another suitable shape.

Referring to FIGS. 2B and 2C, in some embodiments, an optical signal L may pass through the central hollow portion 102, thereby forming penetrating beams L'1. Simultaneously, light may be refracted by the prism, thereby forming divergent beams L'2. In some embodiments, the light divergence structure 100*b* functions as an all-angle light divergence structure because the divergent beams L'2 are refracted in multiple directions by the light divergence structure 100*b*. In some embodiments, the light divergence structure 100*b* is disposed in a photonic device. Further, an included angle θ formed by the light divergence structure 100*b* and a substrate S of the photonic device is between approximately 0° and approximately 90°. In such embodiments, the divergent beams L'2 may be directed to an optical signal receiver R, as shown in FIG. 2C.

Figure 3B:
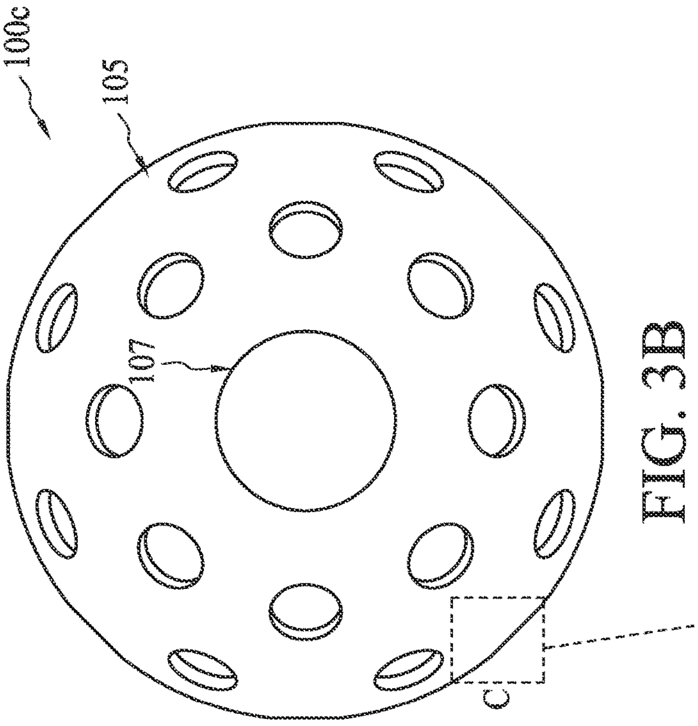
Figure 3C:
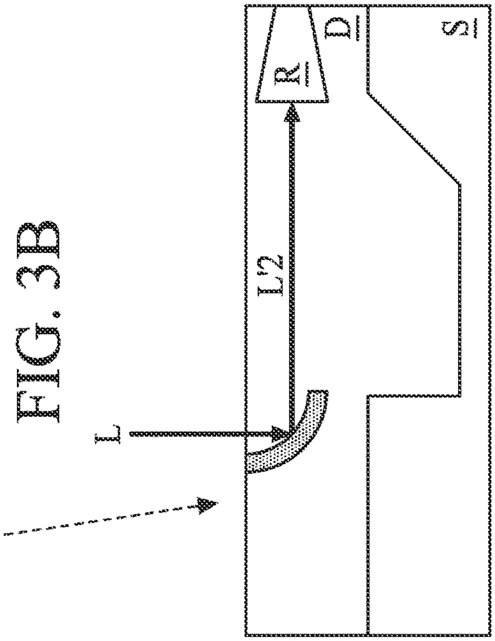
Figure 3A:
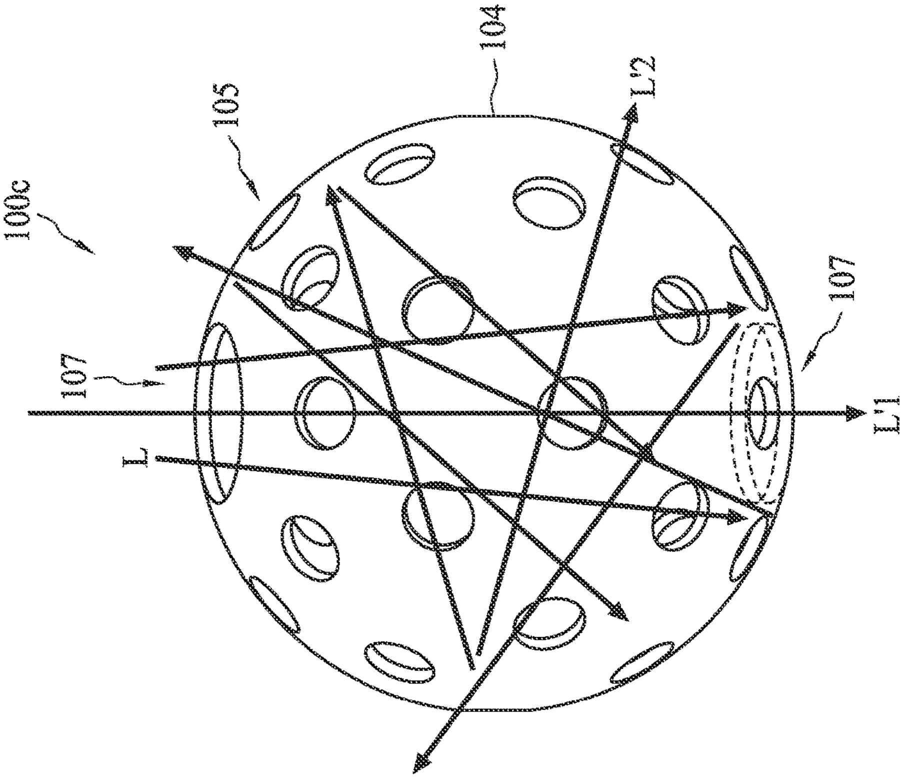

FIGS. 3A to 3C are schematic views of a light divergence structure according to aspects of the present disclosure in one or more embodiments, wherein FIG. 3A is a side view of the light divergence structure when light is introduced, FIG. 3B is a top view of the light divergence structure, and FIG. 3C is a partial view taken from frame C of FIG. 3B. In some embodiments, a light divergence structure 100*c* is provided, and the light divergence structure 100*c* can be a hollow ball-like structure. In some embodiments, the light divergence structure 100*c* includes a main body 104, with a plurality of holes 105 formed in the main body 104. Further, at least a pair of holes 107 are disposed at two ends of a diameter of the hollow ball-like structure. In some embodiments, a diameter of the pair of the holes 107 is greater than a diameter of other holes 105. In some embodiments, the main body 104 includes a transparent material, such as quartz, but the disclosure is not limited thereto. A reflective coating (not shown) may be formed over an inner surface of the main body 104 of the light divergence structure 100*c*. Materials used to form the reflective coating may be similar to those described above; therefore, repeated description is omitted for brevity.

Referring to FIGS. 3A and 3C, in some embodiments, an optical signal L is introduced into the light divergence structure 100*c*. In some embodiments, light passing through the light divergence structure 100*c* through the pair of holes 107 is referred to as penetrating beams L'1. Simultaneously, the optical signal L introduced into the light divergence structure 100*c* may be reflected by the reflective coating over the inner surface of the main body 104 until the optical signal L exits the light divergence structure 100*c* through the holes 105, and is therefore referred to as divergent beams L'2, as shown in FIG. 3C. In some embodiments, the light divergence structure 100*c* functions as an all-angle light divergence structure because the divergent beams L'2 are reflected in multiple directions by the light divergence structure 100*c*. In some embodiments, the light divergence structure 100*c* is disposed in a photonic device. In such embodiments, the divergent beams L'2 may be directed to an optical signal receiver R, as shown in FIG. 3C.

Accordingly, by refracting or reflecting the introduced beams, the optical signal L that has one single direction can be diverted in multiple directions by the light divergence structures 100*a*, 100*b* and 100*c*. As mentioned above, the light divergence structures 100*a*, 100*b* and 100*c* are referred to an all-angle light divergence structure, respectively.

Figure 4:
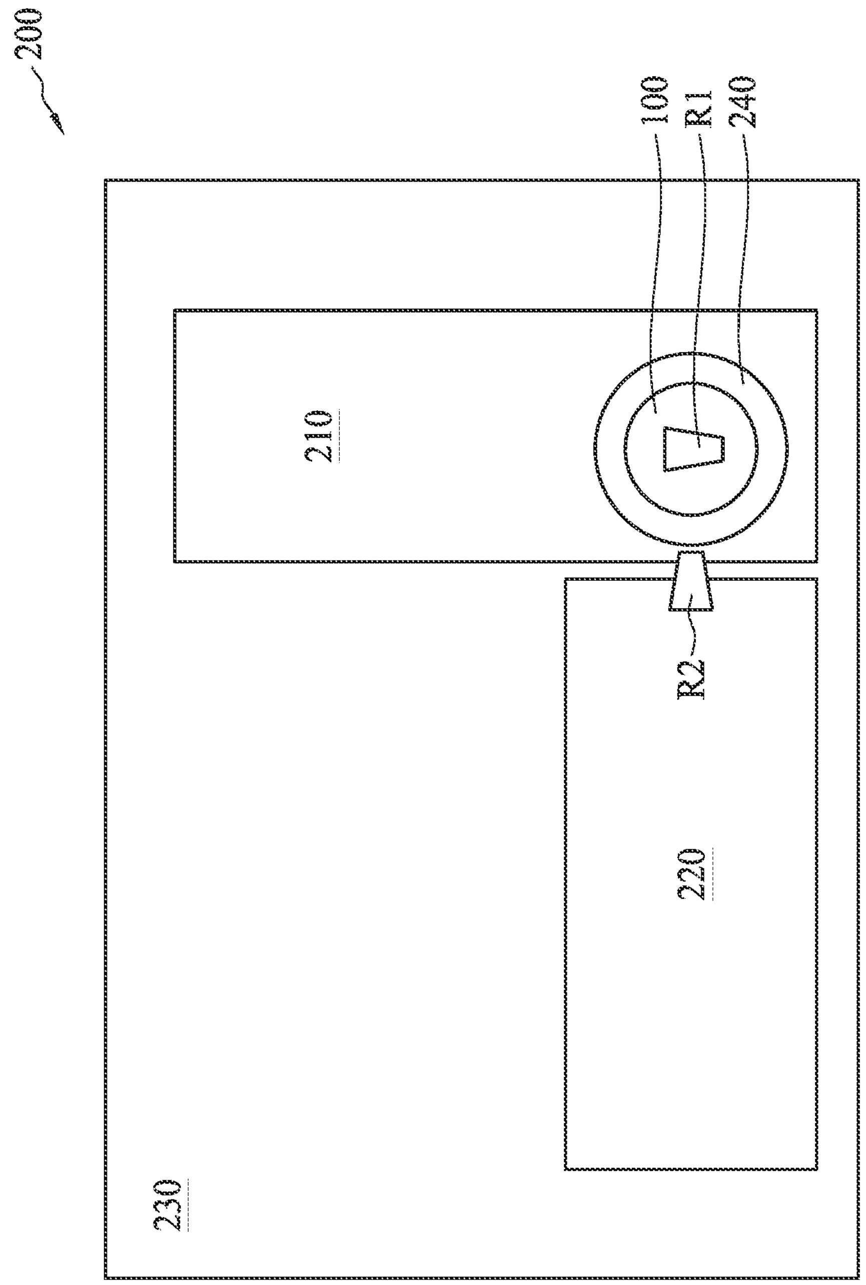
FIG. 4 is a top view of a semiconductor photonic package according to various embodiments of the present disclosure.

FIG. 4 is a top view of a semiconductor photonic package according to various embodiments of the present disclosure. In some embodiments, a semiconductor photonic package 200 including multi-type photonic devices is provided. For example, the semiconductor photonic package 200 may include a first photonic die 210, a second photonic die 220, and a light divergence structure 100 integrated in a substrate 230. Further, the semiconductor photonic package 200 includes a light source 240. In some embodiments, the first photonic die 210 may include at least a silicon-based photonic device, and thus is referred to as a Si-based photonic die. The second photonic die 220 may include at least a germanium-based photonic device, and thus is referred to as a Ge-based photonic die. In some embodiments, the first photonic die 210 is a part of a wafer, which may include a plurality of identical first photonic dies 210. The second photonic die 220 is apart of another wafer, which may include a plurality of identical second photonic dies 220. The first and second photonic dies 210 and 220 respectively have functions of receiving optical signals, transmitting the optical signals inside the photonic dies, transmitting the optical signals out of the photonic dies, and communicating electronically with electronic dies. Briefly speaking, each of the first and second photonic dies 210 and 220 is responsible for input and output of the optical signals.

Figure 5:
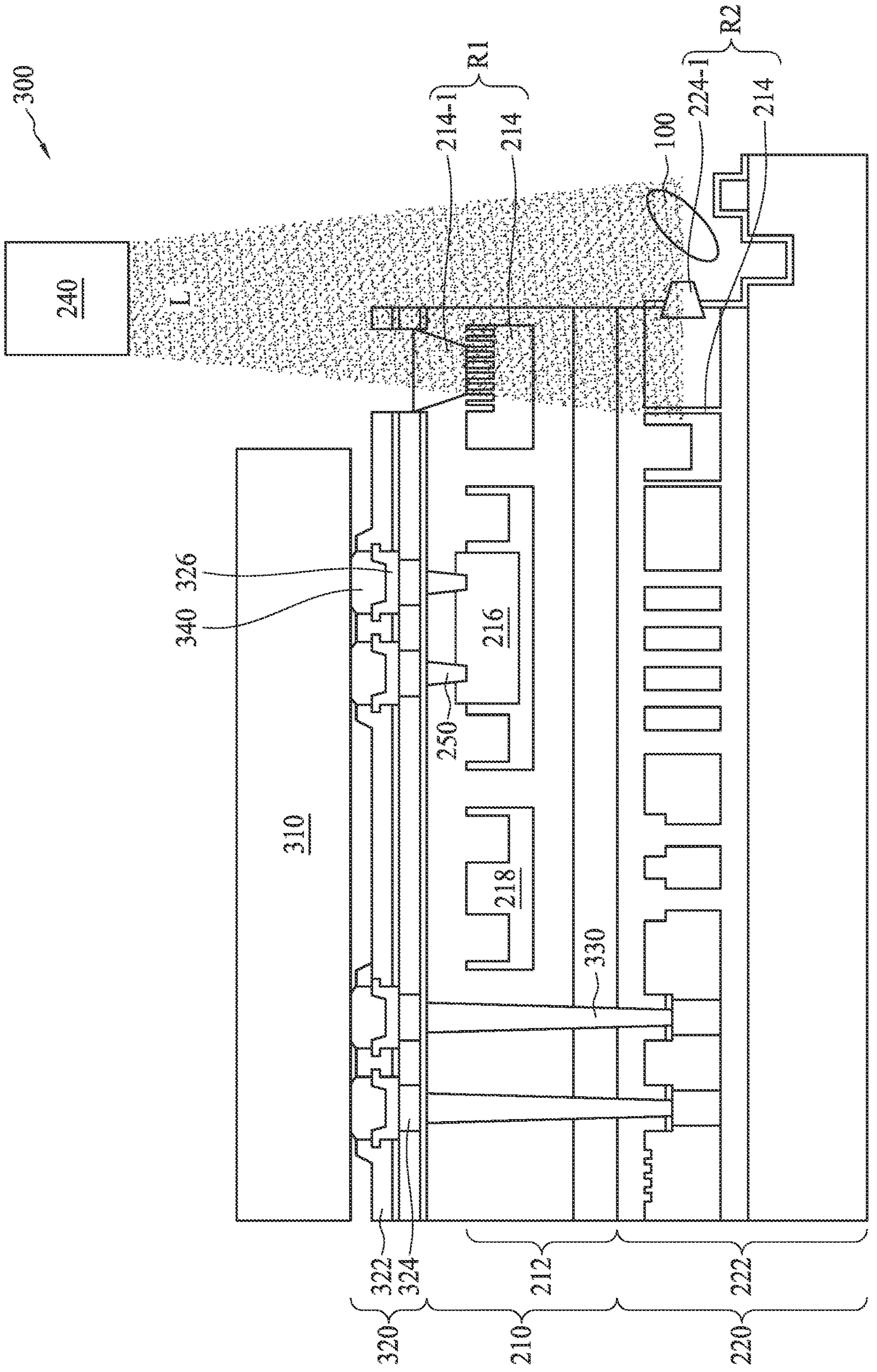
FIG. 5 is a cross-sectional view of a semiconductor photonic package according to various embodiments of the present disclosure.
Figure 9:
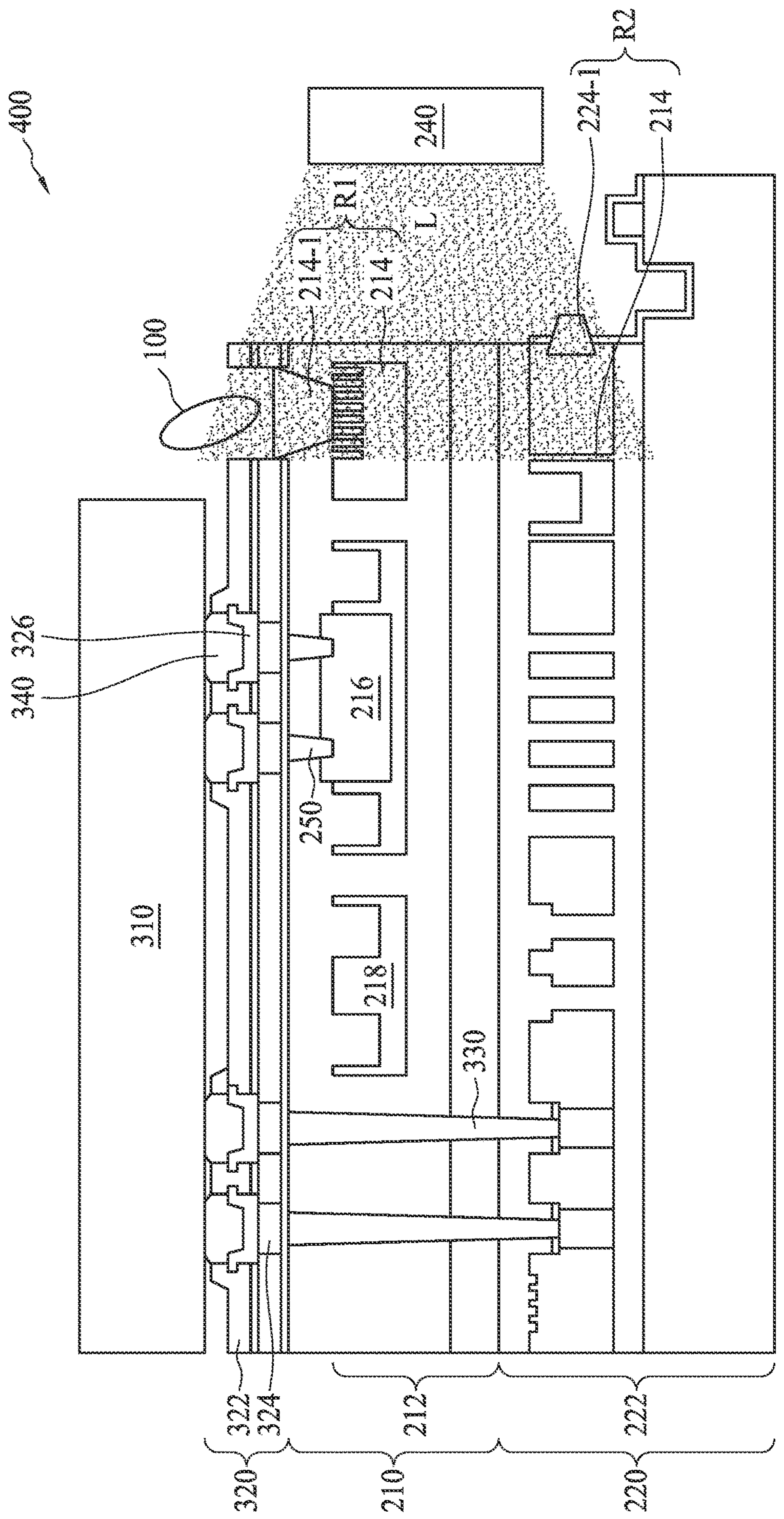
FIG. 9 is a cross-sectional view of a semiconductor photonic package according to various embodiments of the present disclosure.

FIG. 5 is a cross-sectional view of the semiconductor photonic package according to various embodiments of the present disclosure. Referring to FIG. 5, the first photonic die 210 includes a die substrate 212. The die substrate 212 may be a semiconductor substrate, which may be a silicon substrate, a silicon germanium substrate, or a substrate formed of other semiconductor materials. In some embodiments, the die substrate 212 may be a semiconductor-on-insulator (SOI) substrate. A waveguide for internal transmission of optical signals may be formed in the die substrate 212. A grating coupler 214 may be formed in the die substrate 212 for receiving an optical signal from the light source 240 and transmitting the optical signal to the waveguide. In some embodiments, an overlying facet 214-1 may be formed over the grating coupler 214, but the disclosure is not limited thereto. In some embodiments, the grating coupler 214 and the overlying facet 214-1 are referred to as an optical signal receiver R1. A photodetector 216 is formed in the die substrate 212 for transforming the optical signal into an electrical signal. In some embodiments, the photodetector 216 is a Si-based photodetector. A modulator 218 may be formed in the die substrate 212 for modulating the optical signals. In some embodiments, the first photonic die 210 further includes various other devices and circuits that may be used for processing and transmitting optical signals and electrical signals, though not shown. The abovementioned elements and devices are shown in FIGS. 5 and 9.

Still referring to FIG. 5, the second photonic die 220 includes a die substrate 222. The die substrate 222 may be a semiconductor substrate, which may be a silicon substrate, a silicon germanium substrate, or a substrate formed of other semiconductor materials. In some embodiments, the die substrate 222 may be a semiconductor-on-insulator (SOI) substrate. A waveguide for internal transmission of optical signals may be formed in the die substrate 222. A coupler such as an Echelle grating coupler 224 may be formed in the die substrate 222 for receiving an optical signal from the light source 240 and transmitting the optical signal to the waveguide. In some embodiments, a sidewall facet 224-1 may be formed adjacent to the coupler 224, but the disclosure is not limited thereto. In some embodiments, the coupler 224 and the sidewall facet 224-1 are referred to as an optical signal receiver R2. A photodetector (not shown) is formed in the die substrate 222 for transforming the optical signal into an electrical signal. In some embodiments, the photodetector is a Ge-based photodetector. A modulator (not shown) may be formed in the die substrate 222 for modulating the optical signals. In some embodiments, the second photonic die 220 further includes various other devices such as a distributed Bragg reflector, a rib-to-strip waveguide, and circuits that may be used for processing and transmitting optical signals and electrical signals, though not shown. The abovementioned elements and devices are shown in FIGS. 5 and 9.

Referring back to FIG. 4, the substrate 230 may be an interposer or an electronic die that is electrically connected to the first photonic die 210 and the second photonic die 220. In some embodiments, when the substrate 230 is an electronic die, which acts as a processing unit, the substrate 230 may include a controlling circuit for controlling operation of the devices in the first and second photonic dies 210 and 220, and for processing the electrical signals converted from the optical signals in the first and second photonic dies 210 and 220.

The light divergence structure 100*a*, 100*b* or 100*c* may be disposed in a dielectric layer D (shown in FIGS. 1D, 2C and 3C) of the semiconductor photonic package 200. The light divergence structure 100 of the semiconductor photonic package 200 may be the light divergence structure 100*a*, the light divergence structure 100*b* or the light divergence structure 100*c*. In some embodiments, the light divergence structure 100 may be disposed directly over the optical signal receiver R1 and beside the optical signal receiver R2. In some embodiments, when the light divergence structure 100*a* or the light divergence structure 100*b* is adopted in the semiconductor photonic package 200, an included angle θ is formed by the light divergence structure 100*a* or 100*b* and a surface of the substrate 230 of the semiconductor photonic package 200, as the substrate S shown in FIGS. 1D and 2C.

It should be understood that in a Si-based photonic device, the optical signal is received from above a top surface, while in a Ge-based photonic device the optical signal is received from a side. In some comparative approaches, at least two light sources (e.g., optical fiber-provided laser beams) are required for each of the Si-based photonic device and the Ge-based photonic device. In contrast to the comparative approaches, one single light source 240 is used in the semiconductor photonic package 200. As shown in FIG. 4, in some embodiments, the light source 240 is disposed over the light divergence structure 100 of the semiconductor photonic package 200 in order to provide an optical signal such as a laser beam. The laser beam may pass through the light divergence structure 100 to form the penetrating beams L'1 and reach the optical signal receiver R1 directly under the light source 240. Simultaneously, the laser beam is refracted or reflected by the light divergence structure 100 to form the divergent beams L'2 that are directed to the optical signal receiver R2 beside the light divergence structure 100.

Accordingly, the first photonic die 210 (i.e., the Si-based photonic device), which receives the optical signal through the top surface, and the second photonic die 220 (i.e., the Ge-based photonic device), which receives the optical signal through the side surface, share a same light source 240. In other words, the semiconductor photonic package 200 can be a multi-type photonic package that includes various photonic devices laterally integrated on one substrate 230. Further, the various photonic devices of the semiconductor photonic package 200 can share one light source 240 due to the light divergence structure 100.

Please refer to FIG. 5, which is a cross-sectional view of a semiconductor photonic package according to various aspects of the present disclosure. In some embodiments, the semiconductor photonic package 300 includes a first photonic die 210, a second photonic die 220 and a substrate 310 vertically integrated and stacked, as shown in FIG. 5. Elements and devices in the first photonic die 210 and the second photonic die 220 of the semiconductor photonic package 300 are similar to the elements and the devices in the first photonic die 210 and the second photonic die 220 of the semiconductor photonic package 200; thus, repeated descriptions are omitted for brevity. In some embodiments, the first photonic die 210 and the second photonic die 220 are bonded by a bonding structure (not shown). The bonding structure may include a metal bonding structure, a dielectric bonding structure or a hybrid bonding structure.

In some embodiments, a connection structure such as a redistribution layer (RDL) 320 is formed over the first photonic die 210. The RDL 320 includes a plurality of dielectric layers 322 and RDL lines and vias (in combination referred to as 324) therein. The dielectric layers 322 may be formed of silicon oxide, silicon nitride, silicon carbide, or other material. The RDL lines and vias 324 are formed in the dielectric layers 322. In some embodiments, under-bump metallurgies (UBMs) 326 are formed for electrical connection to the RDL 320.

In some embodiments, the first photonic die 210 further includes connecting vias 250 electrically coupling the devices (i.e., the photodetector 216) and circuits to the RDL 320. In some embodiments, the semiconductor photonic package 300 further includes a plurality of through vias 330 extending from the die substrate 222 of the second photonic die 220 to the RDL 320. The devices and circuits of the second photonic die 220 are electrically coupled to the RDL 320 through the vias 330, as shown in FIG. 5.

Further, the RDL 320 is bonded to the substrate 310. In some embodiments, the substrate 310 may be an electronic die. Still referring to FIG. 5, a plurality of electrical connectors 340 are formed over the RDL 320 (i.e., over the UBMs 326). The electrical connectors 340 are formed of copper, nickel, titanium, or multi-layers thereof, and may be formed as metal pillars. In some embodiments, the electrical connectors 340 may also include solder caps (not shown). Additionally, underfill may be formed to surround the electrical connectors 340 and to secure the bonding between the RDL 320 and the electronic die 310. Accordingly, the first photonic die 210 and the second photonic die 220 are electrically connected to the electronic die 310 through the through vias 330, the RDL 320 and the electrical connectors 340.

The semiconductor photonic package 300 further includes a light source 240 disposed over the first photonic die 210, the second photonic die 220 and the electronic die 310. As shown in FIG. 5, in some embodiments, an optical signal L (i.e., a laser beam) emitted from the light source 240 is directly introduced to the optical signal receiver R1 of the first photonic die 210, and is thus received by the optical signal receiver R1 of the first photonic die 210.

Still referring to FIG. 5, the light divergence structure 100 is disposed in the semiconductor photonic package 300. Further, the light divergence structure 100 is disposed level with the second photonic die 220. In some embodiments, the light divergence structure 100 may be disposed in a dielectric layer 229 (shown in FIGS. 6B, 7B and 8B) of the second photonic die 220. In some embodiments, the light divergence structure 100 is disposed adjacent to the optical signal receiver R2 of the second photonic die 220, but separated from the optical signal receiver R2 of the second photonic die 220. The light divergence structure 100 can be the light divergence structure **100*a*, the light divergence structure 100*b* or the light divergence structure 100*c***.

Figures 6A, 6B:
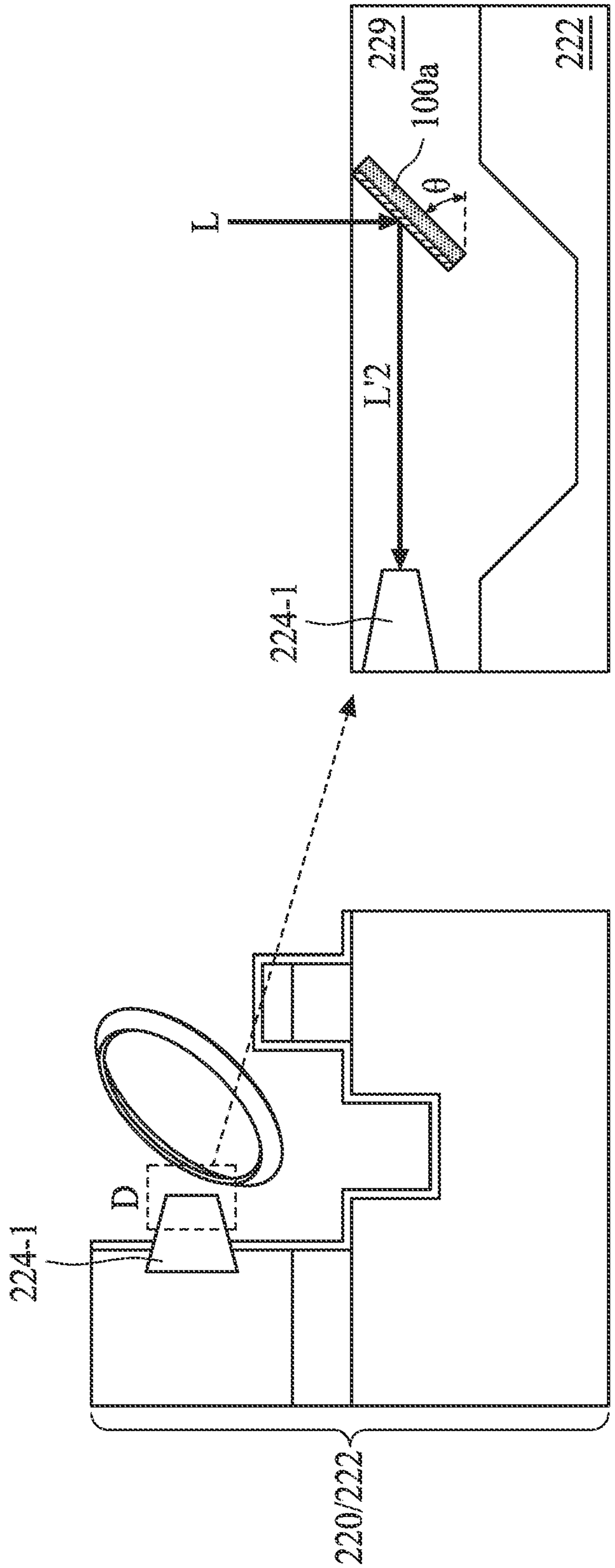
FIG. 6A is an enlarged view of a portion of the semiconductor photonic package of FIG. 5.
FIG. 6B is a partial view taken from frame D of FIG. 6A.

Referring to FIGS. 6A and 6B, in some embodiments, when the light divergence structure **100*a* is adopted in the semiconductor photonic package 300, an included angle θ is formed by the light divergence structure 100*a* and a surface of the substrate 222 of the second photonic die 220. The included angle θ is between approximately 0° and approximately 90°. Accordingly, the optical signal L is reflected by the reflective coating 106 of the light divergence structure 100*a*, thereby forming the divergent beams L'2, as shown in FIG. 6B. The divergent beams L'2 may be directed to the optical signal receiver R2 of the second photonic die 220 and thus received by the optical signal receiver R2 of the second photonic die 220**.

Figure 7B:
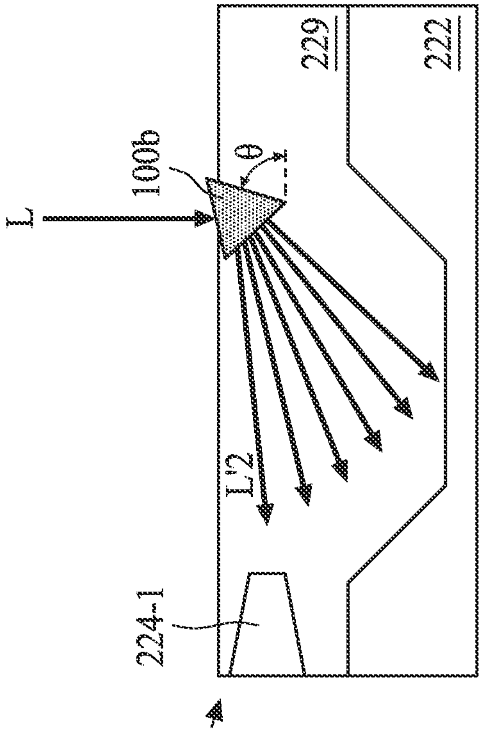
FIG. 7B is a partial view taken from frame E of FIG. 7A.
Figure 7A:
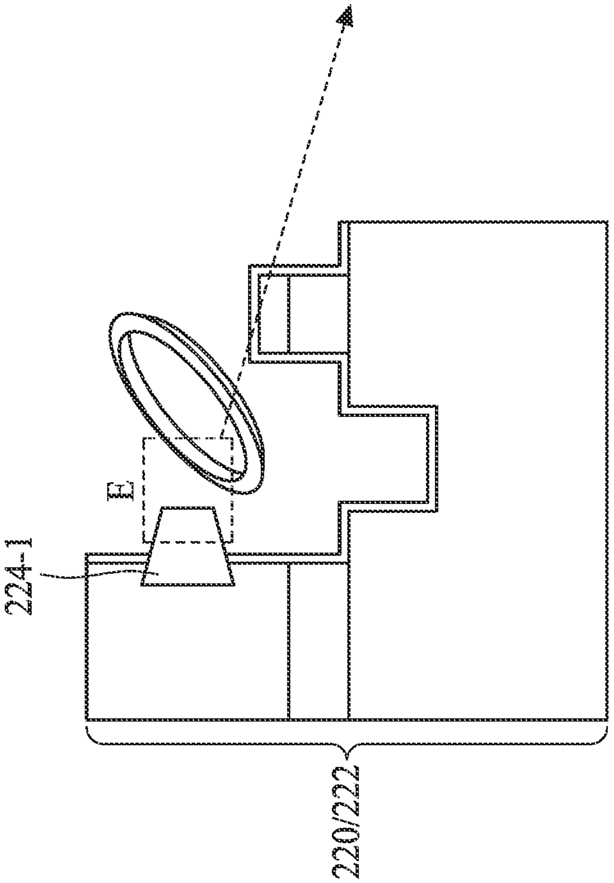
FIG. 7A is an enlarged view of a portion of the semiconductor photonic package of FIG. 5.

Referring to FIGS. 7A and 7B, in some embodiments, when the light divergence structure **100*b* is adopted in the semiconductor photonic package 300, an included angle θ is formed by a surface of the light divergence structure 100*b* and a surface of the substrate 222 of the second photonic die 220. The included angle θ is between approximately 0° and approximately 90°. In some embodiments, each surface of the prism-like light divergence structure 100*b* and the surface of the substrate 222 of the second photonic die 220 form an included angle θ between approximately 0° and approximately 90°. Accordingly, the optical signal L is refracted by the light divergence structure 100*b*, thereby forming divergent beams L'2, as shown in FIG. 7B. The divergent beams L'2 may be directed to the optical signal receiver R2 of the second photonic die 220 and thus received by the optical signal receiver R2 of the second photonic die 220**.

Figure 8B:
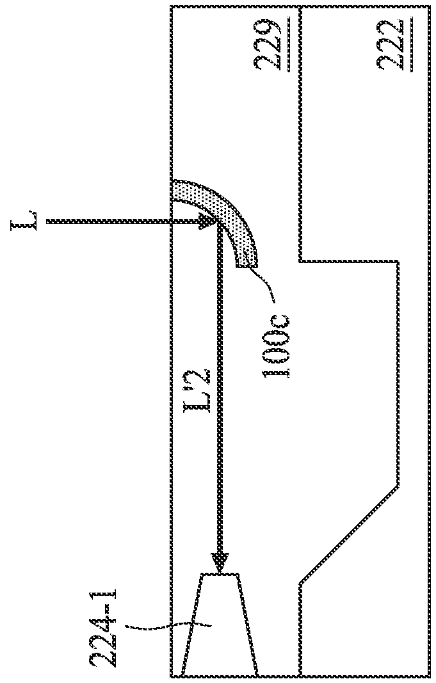
FIG. 8B is a partial view taken from frame F of FIG. 8A.
Figure 8A:
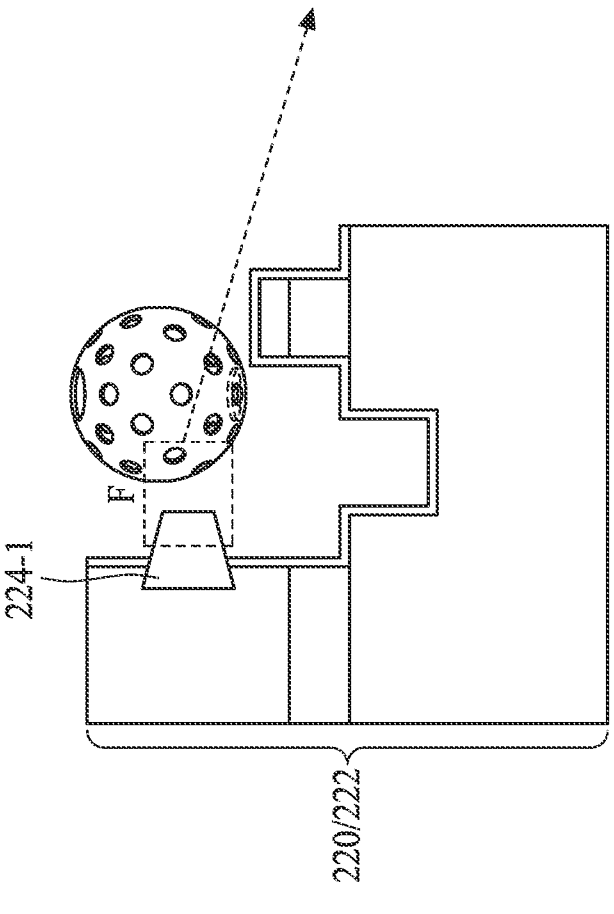
FIG. 8A is an enlarged view of a portion of the semiconductor photonic package of FIG. 5.

Referring to FIGS. 8A and 8B, in some embodiments, when the light divergence structure **100*c* is adopted in the semiconductor photonic package 300, the optical signal L introduced into the light divergence structure 100*c* may be reflected by the reflective coating over the inner surface of the main body 104 until the optical signal L exists the light divergence structure 100***c* through the holes 105, and is therefore referred to as divergence beams L'2, as shown in FIG. 8B. The divergent beams L'2 may be directed to the optical signal receiver R2 of the second photonic die 220 and thus received by the optical signal receiver R2 of the second photonic die 220.

Accordingly, by refracting or reflecting the introduced optical signal L, the optical signal L that originally has one single direction (i.e., from above the semiconductor photonic package 300) can be diverted in multiple directions by the light divergence structures 100*a*, 100*b* or 100*c*. In some embodiments, the light divergence structures 100*a*, 100*b* and 100*c* function as all-angle light divergence structures.

Please refer to FIG. 9, which is a cross-sectional view of a semiconductor photonic package according to various aspects of the present disclosure. In some embodiments, the semiconductor photonic package 400 includes a first photonic die 210, a second photonic die 220 and a substrate 310 vertically integrated and stacked. Elements and devices in the first photonic die 210 and the second photonic die 220 of the semiconductor photonic package 400 are similar to the elements and the devices in the first photonic die 210 and the second photonic die 220 of the semiconductor photonic package 300; thus, repeated descriptions are omitted for brevity. As mentioned above, the first photonic die 210 and the second photonic die 220 are bonded by a bonding structure (not shown). The bonded structure may include a metal bonding structure, a dielectric bonding structure or a hybrid bonding structure.

In some embodiments, a connection structure such as a redistribution layer (RDL) 320 is formed over the first photonic die 210. The RDL 320 includes a plurality of dielectric layers 322 and RDL lines and vias (in combination referred to as 324) therein. The RDL lines and vias 324 are formed in the dielectric layers 322. In some embodiments, UBMs 326 are formed for electrical connection to the RDL 320.

In some embodiments, the first photonic die 210 further includes connecting vias 250 electrically coupling the devices (i.e., the photodetector 216) and circuits to the RDL 320. In some embodiments, the semiconductor photonic package 400 further includes a plurality of through vias 330 extending from the die substrate 222 of the second photonic die 220 to the RDL 320. The devices and circuits of the second photonic die 220 are electrically coupled to the RDL 320 through the vias 330, as shown in FIG. 9.

Further, the RDL 320 is bonded to the substrate 310. In some embodiments, the substrate 310 may be an interposer or an electronic die. Still referring to FIG. 9, a plurality of electrical connectors 340 are formed over the RDL 320. In some embodiments, the electrical connectors 340 may also include solder caps (not shown). Additionally, underfill may be formed to surround the electrical connectors 340 and to secure the bonding between the RDL 320 and the substrate 310. Accordingly, the first photonic die 210 and the second photonic die 220 are electrically connected to the substrate 310 through the through vias 330, the RDL 320 and the electrical connectors 340.

The semiconductor photonic package 400 further includes a light source 240 disposed beside the first photonic die 210 and the second photonic die 220. Still referring to FIG. 9, in some embodiments, an optical signal L emitted from the light source 240 is directly introduced to the optical signal receiver R2 of the second photonic die 220, and received by the optical signal receiver R2 of the second photonic die 220.

Referring to FIG. 9, the light divergence structure 100 is disposed in the semiconductor photonic package 400. Further, the light divergence structure 100 is disposed level with the first photonic die 210 or with the RDL 320. In some embodiments, the light divergence structure 100 may be disposed in a dielectric layer 219 (shown in FIGS. 10B, 11B and 12B) of the first photonic die 210. In some embodiments, the light divergence structure 100 is disposed over the optical signal receiver R1 of the first photonic die 210. The light divergence structure 100 can be the light divergence structure 100*a*, the light divergence structure 100*b* or the light divergence structure 100*c*.

Figures 10A, 10B:
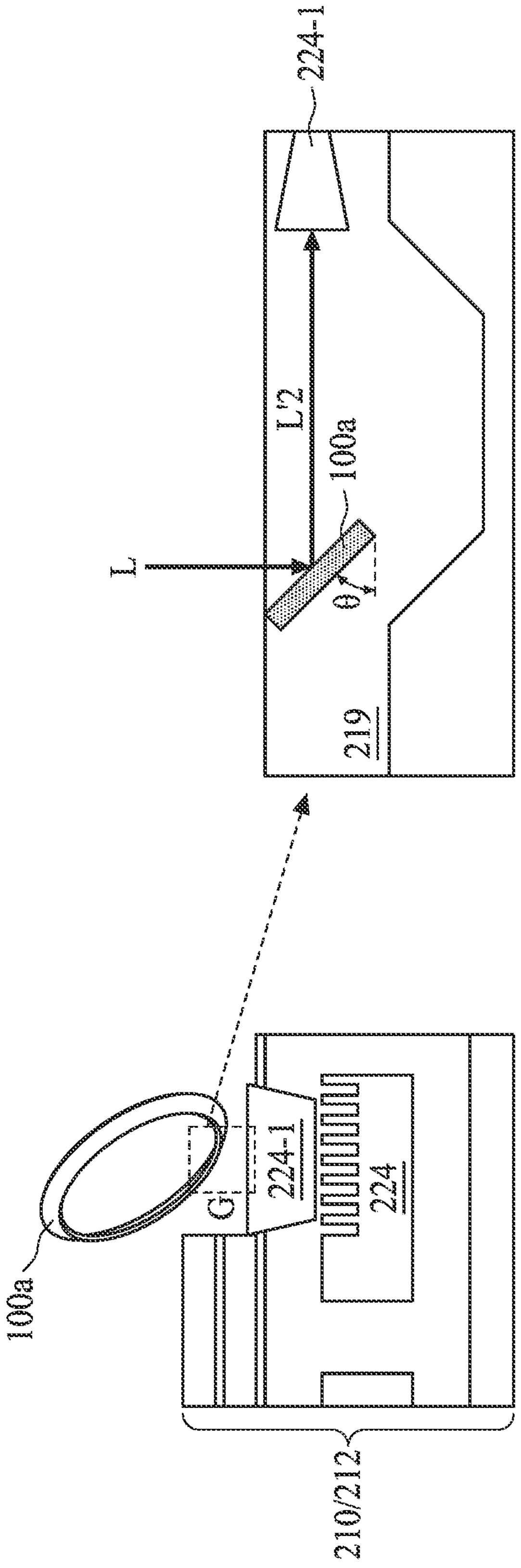
FIG. 10A is an enlarged view of a portion of the semiconductor photonic package of FIG. 9.
FIG. 10B is a partial view taken from frame G of FIG. 10A.

Referring to FIGS. 10A and 10B, in some embodiments, when the light divergence structure 100*a* is adopted in the semiconductor photonic package 400, an included angle θ is formed by the light divergence structure 100*a* and a surface of the substrate 212 of the first photonic die 210. The included angle θ is between approximately 0° and approximately 90°. Accordingly, the optical signal L may be reflected by the reflective coating 106 of the light divergence structure 100*a*, thereby forming divergent beams L'2, as shown in FIG. 10B. The divergent beams L'2 may be directed to the optical signal receiver R1 of the first photonic die 210 and thus received by the optical signal receiver R1 of the first photonic die 210.

Figure 11B:
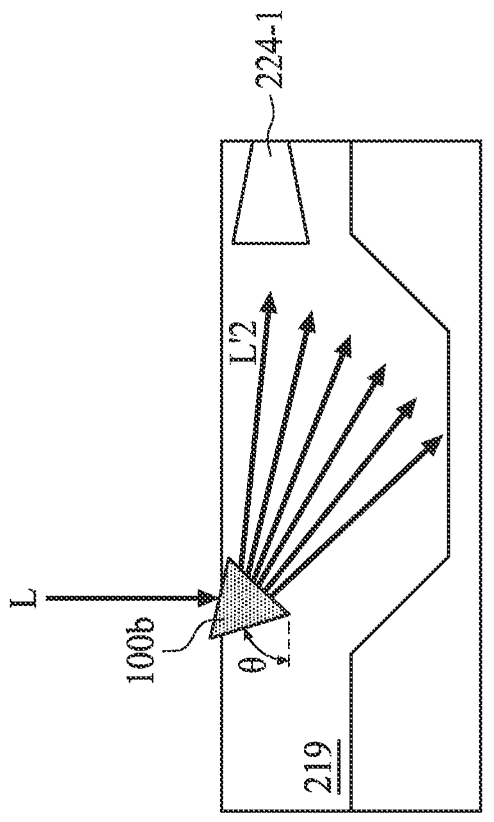
FIG. 11B is a partial view taken from frame H of FIG. 11A.
Figure 11A:
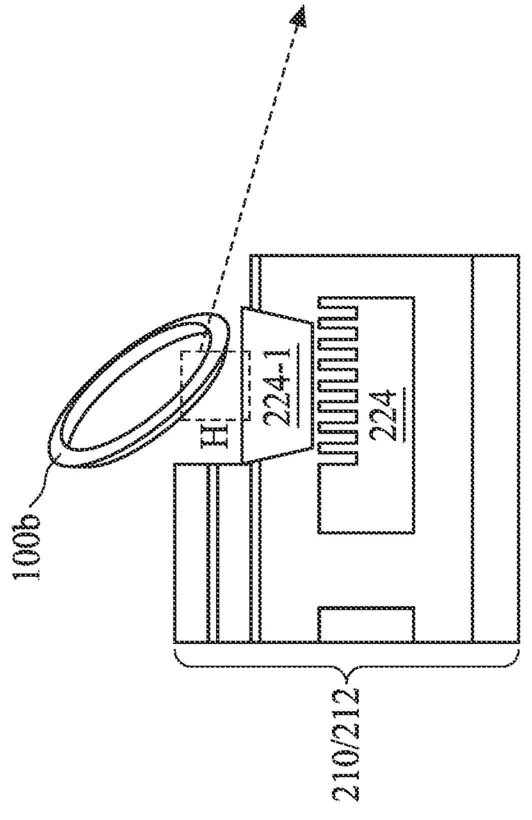
FIG. 11A is an enlarged view of a portion of the semiconductor photonic package of FIG. 9.

Referring to FIGS. 11A and 11B, in some embodiments, when the light divergence structure 100*b* is adopted in the semiconductor photonic package 400, an included angle θ is formed by a surface of the light divergence structure 100*b* and a surface of the substrate 212 of the first photonic die 210. The included angle θ is between approximately 0° and approximately 90°. In some embodiments, each surface of the prism-like light divergence structure 100*b* and the surface of the substrate 222 of the second photonic die 220 form an included angle θ between approximately 0° and approximately 90°. Accordingly, the optical signal may be refracted by the light divergence structure 100*b*, thereby forming the divergent beams L'2, as shown in FIG. 11B. The divergent beams L'2 may be directed to the optical signal receiver R1 of the first photonic die 210 and thus received by the optical signal receiver R1 of the first photonic die 210.

Figure 12B:
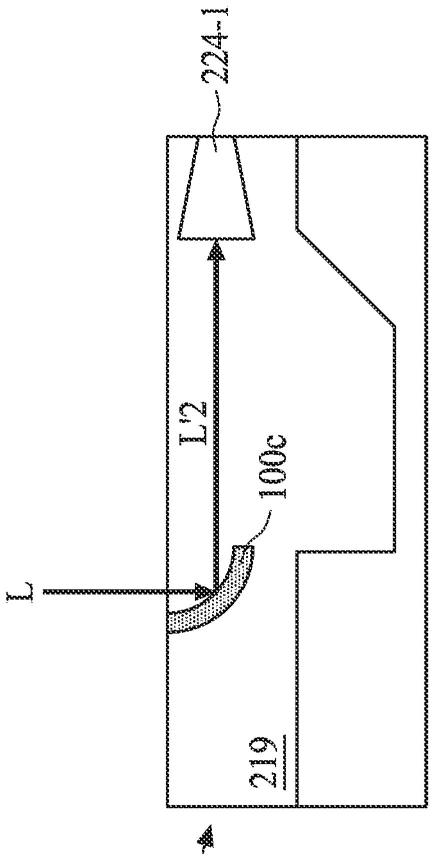
FIG. 12B is a partial view taken from frame I of FIG. 12A.
Figure 12A:
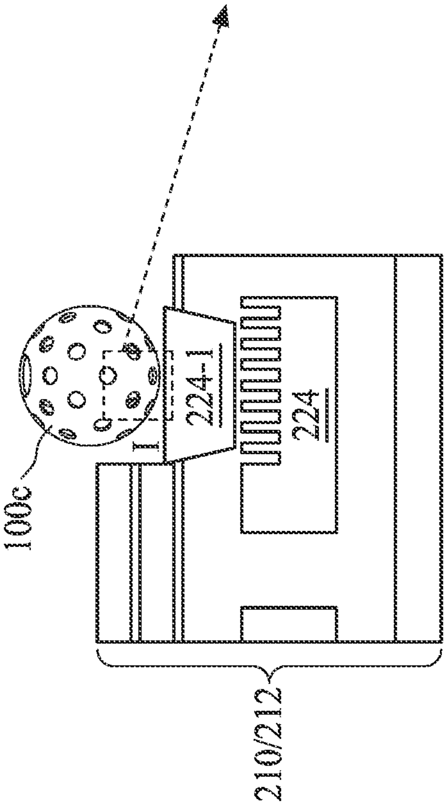
FIG. 12A is an enlarged view of a portion of the semiconductor photonic package of FIG. 9.

Referring to FIGS. 12A and 12B, in some embodiments, when the light divergence structure 100*c* is adopted in the semiconductor photonic package 400, the optical signal L introduced into the light divergence structure 100*c* may be reflected by the reflective coating over the inner surface of the main body 104 until the optical signal L exist the light divergence structure 100*c* through the holes 105, and is therefore referred to as divergent beams L'2, as shown in FIG. 12B. The divergent beams L'2 may be directed to the optical signal receiver R1 of the first photonic die 210 and thus received by the optical signal receiver R1 of the first photonic die 210.

Accordingly, by refracting or reflecting the introduced optical signal L, the optical signal L that originally has one single direction (i.e., from above the semiconductor photonic package 400) can be diverted in multiple directions by the light divergence structures 100*a*, 100*b* or 100*c*. In some embodiments, the light divergence structures 100*a*, 100*b* and 100*c* function as all-angle light divergence structures.

Referring back to FIGS. 4, 5 and 9, in some embodiments, the light divergence structure 100 helps to accomplish the horizontal or vertical integration of various photonic dies. As shown in FIG. 4, the first photonic die 210 and the second photonic die 220 are horizontally integrated in one plane. In some embodiments, the first photonic die 210 and the second photonic die 220 are disposed at a same level. As mentioned above, the optical signal receiver R1 of the first photonic die 210 receives the optical signal L from above, while the optical signal receiver R2 of the second photonic die 220 receives the optical signal L from a side. In other words, the light source 240 provides the optical signal L vertically to the first optical signal receiver R1, and the optical signal L is reflected or refracted to be laterally directed to the second optical signal receiver R2 by the light divergence structure 100. The optical signal L is received on different planes (i.e., optical signal L from above is vertically received by the first photonic die 210, and the optical signal L from a side is laterally received by the second photonic die 220) and different locations (i.e., the optical signal receiver R1 in the first photonic die 210 and the optical signal receiver R2 in the second photonic die 220) even when the first and second photonic dies 210 and 220 are integrated in one plane. By using the all-angle light divergence structure 100, the optical signal L from a same light source 240 can be received by the photonic dies 210 and 220 on different planes.

As shown in FIGS. 5 and 9, in some embodiments, the first photonic die 210 and the second photonic die 220 are vertically integrated. In such embodiments, the light source 240 may be disposed in various places.

For example, the light source 240 can be disposed over the optical signal receiver R1 of the first photonic die 210 and the optical receiver R2 of the second photonic die 220, as shown in FIG. 5. As mentioned above, the optical signal receiver R1 of the first photonic die 210 receives the optical signal L from above, while the optical signal receiver R2 of the second photonic die 220 receives the optical signal L from a side. The two photonic dies 210 and 220 therefore receive the light signal L from different planes and different locations. In some embodiments, when the light source 240 is disposed over both the optical signal receivers R1 and R2, the light divergence structure 100 is disposed at a level same as a level of the second photonic die 220, or at a level same as a level of the optical signal receiver R2. As mentioned above, the optical signal receiver R1 receives the optical signal directly from above, while the light divergence structure 100 helps to reflect or refract the lights toward the optical signal receiver R2. In other words, the light source 240 provides the optical signal L vertically to the first optical signal receiver R1, and the optical signal L is reflected or refracted to be laterally directed to the second optical signal receiver R2 by the light divergence structure 100. Accordingly, by using the all-angle light divergence structure 100, the optical signal L can be received by the photonic dies 210 and 220 even on different planes.

In other embodiments, as shown in FIG. 9, when the light source 240 is disposed beside the optical signal receivers R1 and R2, the light divergence structure 100 is disposed at a level same as a level of the first photonic die 210, or at a level same as a level of the optical signal receiver R1. As mentioned above, the optical signal receiver R2 receives the optical signal L directly from a side, while the light divergence structure 100 helps to reflect or refract the light toward the optical signal receiver R1. In other words, the light source 240 provides the optical signal L laterally toward the second optical signal receiver R2, and the optical signal L is reflected or refracted to be vertically directed to the first optical signal receiver R1 by the light divergence structure 100. Accordingly, by using the all-angle light divergence structure 100, the optical signal L can be received by the photonic dies 210 and 220 even on different planes.

In contrast to comparative approaches, in which a light source and an optical signal receiver have to be arranged in a one-to-one configuration due to different light-receiving planes, the semiconductor photonic packages of the present disclosure provide a one-to-many configuration for the light source and optical signal receivers due to the all-angle light divergence structure. Accordingly, the light divergence structure provided in the semiconductor photonic packages of the present disclosure allows the optical signals to be directed to optical signal receivers in various locations and/or at various depths. The light divergence structure helps to improve signal receiving in a multi-type semiconductor photonic package.

In some embodiments, a semiconductor photonic package is provided. The semiconductor photonic package includes a first photonic die and a second photonic die laterally disposed over a substrate, a light divergence structure disposed over the first photonic die and beside the second photonic die, and a light source disposed over the light divergence structure. The light source provides an optical signal vertically to the first photonic die, and the optical signal is reflected or refracted to be laterally directed to the second photonic die by the light divergence structure.

In some embodiments, a semiconductor photonic package is provided. The semiconductor photonic package includes a first photonic die, a second photonic die, a light divergence structure, and a light source. The first photonic die includes at least a first optical signal receiver, and the second photonic die includes at least a second optical signal receiver. The second photonic die is vertically stacked under the first photonic die. The light divergence structure is disposed in the second photonic die. The light source is disposed over the first photonic die and the second photonic die. The light source provides an optical signal vertically to the first optical signal receiver, and the optical signal is reflected or refracted to be laterally directed to the second optical signal receiver by the light divergence structure.

In some embodiments, a semiconductor photonic package is provided. The semiconductor photonic package includes a first photonic die, a second photonic die, a light divergence structure, and a light source. The first photonic die includes at least a first optical signal receiver, and the second photonic die includes at least a second optical signal receiver. The second photonic die is vertically stacked under the first photonic die. The light divergence structure is disposed in the first photonic die. The light source is disposed aside the first photonic die and the second photonic die. The light source provides an optical signal laterally toward the second optical signal receiver, and the optical signal is reflected or refracted to be vertically directed to the first optical signal receiver by the light divergence structure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor photonic package comprising:

a first photonic die and a second photonic die laterally disposed over a substrate;

a light divergence structure disposed over the first photonic die and beside the second photonic die; and a light source disposed over the light divergence structure and configured to provide an optical signal vertically to the first photonic die, wherein the optical signal is reflected or refracted to be laterally directed to the second photonic die by the light divergence structure, wherein the light divergence structure comprises a hollow ball-like structure, and a main body of the hollow ball-like structure has a plurality of first holes.

2. The semiconductor photonic package of claim 1, wherein the light divergence structure further comprises a reflective coating formed over an inner surface of the shell of the hollow ball-like structure.

3. A semiconductor photonic package comprising:

a first photonic die comprising at least a first optical signal receiver;

a second photonic die vertically stacked under the first photonic die and comprising at least a second optical signal receiver;

a light divergence structure disposed in the second photonic die; and a light source disposed over the first photonic die and the second photonic die, wherein the light source provides an optical signal vertically to the first optical signal receiver, and the optical signal is reflected or refracted to be laterally directed to the second optical signal receiver by the light divergence structure, wherein the light divergence structure comprises a hollow ball-like structure, and a main body of the hollow ball-like structure has a plurality of holes.

4. The semiconductor photonic package of claim 3, further comprising an electronic die disposed over the first photonic die and the second photonic die, wherein the first photonic die and the second photonic die are electrically coupled to the electronic die.

5. A semiconductor photonic package comprising:

a first photonic die comprising at least a first optical signal receiver;

a second photonic die vertically stacked under the first photonic die and comprising at least a second optical signal receiver;

a light divergence structure disposed in the first photonic die; and a light source disposed beside the first photonic die and the second photonic die, wherein the light source provides an optical signal laterally toward the second optical signal receiver, and the optical signal is reflected or refracted to be vertically directed to the first optical signal receiver by the light divergence structure, wherein the light divergence structure comprises a hollow ball-like structure, and a main body of the hollow ball-like structure has a plurality of holes.

6. The semiconductor photonic package of claim 1, wherein the light divergence structure comprises a pair of second holes at two ends of a diameter.

7. The semiconductor photonic package of claim 6, wherein a diameter of the pair of the second holes is greater than a diameter of the first holes.

8. The semiconductor photonic package of claim 1, wherein the main body of the light divergence structure comprises a transparent material.

9. The semiconductor photonic package of claim 1, wherein the first photonic die comprises at least a silicon-based photonic device.

10. The semiconductor photonic package of claim 1, wherein the second photonic die comprises at least a germanium-based photonic device.

11. The semiconductor photonic package of claim 3, wherein the light divergence structure further comprises a reflective coating formed over an inner surface of the shell of the hollow ball-like structure.

12. The semiconductor photonic package of claim 3, further comprises a redistribution layer (RDL) disposed over the first photonic die.

13. The semiconductor photonic package of claim 12, wherein the first photonic die further comprises a plurality of connecting vias coupled to the RDL.

14. The semiconductor photonic package of claim 12, wherein the second photonic die further comprises a plurality of through vias coupled to the RDL.

15. The semiconductor photonic package of claim 3, wherein the main body of the light divergence structure comprises a transparent material.

16. The semiconductor photonic package of claim 5 wherein the light divergence structure further comprises a reflective coating formed over an inner surface of the shell of the hollow ball-like structure.

17. The semiconductor photonic package of claim 5, further comprises a redistribution layer (RDL) disposed over the first photonic die.

18. The semiconductor photonic package of claim 17, wherein the first photonic die further comprises a plurality of connecting vias coupled to the RDL.

19. The semiconductor photonic package of claim 17, wherein the second photonic die further comprises a plurality of through vias coupled to the RDL.

20. The semiconductor photonic package of claim 5, wherein the main body of the light divergence structure comprises a transparent material.

* * * * *